April 28, 1959      P. L. JESSEN      2,884,608

ELECTROMAGNETIC PRESSURE TRANSDUCER

Filed March 18, 1957

INVENTOR:
Phillip L. Jessen
BY
Edward L. Amonette
Agent

United States Patent Office 2,884,608
Patented Apr. 28, 1959

2,884,608

ELECTROMAGNETIC PRESSURE TRANSDUCER

Phillip L. Jessen, Albuquerque, N. Mex., assignor to Ultradyne, Inc., Albuquerque, N. Mex., a corporation of New Mexico Application March 18, 1957, Serial No. 646,891

7 Claims. (Cl. 336—30)

My invention relates to pressure-measuring devices, and more particularly to those devices employing variable-reluctance magnetic circuits.

Many such devices of the prior art include a magnetic diaphragm clamped at its periphery between two cup-shaped magnetic pieces, each of which has a single center pole piece extending towards the diaphragm. Movement of the diaphragm in response to a pressure change varies the reluctance of the magnetic circuit, the variation being detected by a coil or coils wrapped on either or both of the pole pieces.

A difficulty with this type of construction was realized in modern radio telemetry applications as high-frequency signal voltages were applied to the coils. It was found that severe losses were met with, due to eddy currents in the unlaminated cup-shaped magnetic pieces. Since it is not economical to laminate the relatively massive pieces, I have separated the flux-carrying portions of the transducer from the diaphragm support and have laminated the flux-carrying portions. By redesigning those portions, I have eliminated the diaphragm support as a flux-carrying part. In doing so, I have overcome another fault of the prior art, namely the losses incurred at high-frequency operation due to tiny air gaps at the junctions of the diaphragm and its support.

Briefly, my invention comprises a magnetic diaphragm clamped at its periphery between a pair of sturdy members, within which members one or more magnetic pole pieces are supported. Each pole piece has a plurality of arms reaching towards the diaphragm, with a conducting coil wound on one or more of the arms. Thus a complete magnetic circuit is formed including the diaphragm, a pole piece, and the space gaps between the pole piece arms and the diaphragm. Means are provided for the application of a pressure difference between the two sides of the diaphragm which will flex the diaphragm, changing the reluctance of the magnetic circuit and varying the current in the coil, which is connected in a suitable indicating circuit. The diaphragm support members may be made of magnetic material, in which case they will shield the coil from external magnetic fields and aid in the attainment of more accurate measurements.

It is a general object of my invention to provide for the economical, accurate measurement of static or dynamic pressures. Other objects and a further understanding of the invention will be apparent on reading the detailed description to follow, in conjunction with the attached drawing in which.

Figure 1:
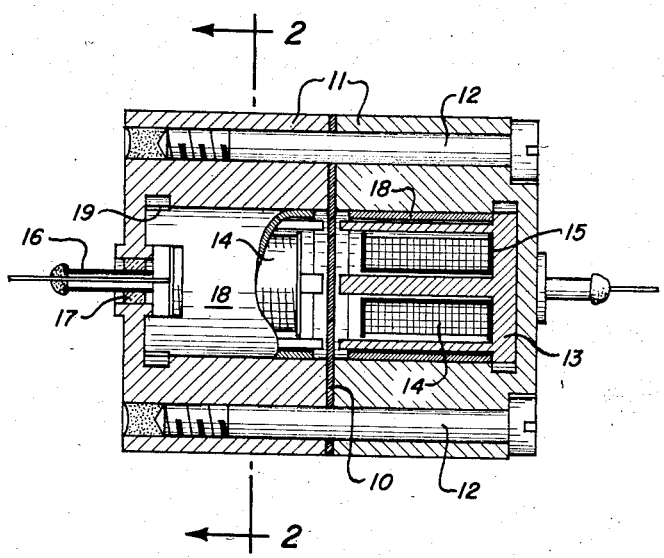
Fig. 1 is a partial cutaway view of a preferred embodiment of my invention having an E-shaped core.
Figure 2:
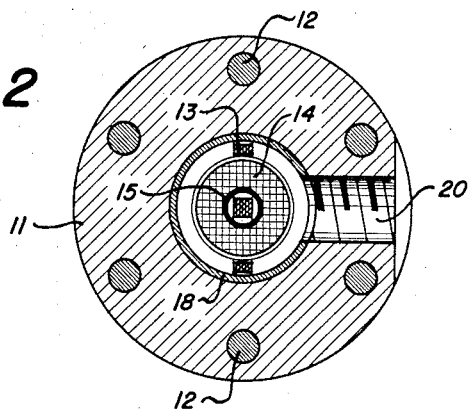
Fig. 2 is a cross-sectional view of the same embodiment, taken at 2—2 in Fig. 1.

Referring now to Figs. 1 and 2, magnetic diaphragm 10 is seen to be supported by the two halves of metallic case 11 which are clamped against the diaphragm by means of a number of screws 12 located near the periphery of the diaphragm. On either side of the diaphragm is located an E-shaped core 13, on the center leg of which is a coil 14. Dielectric coil form 15 insulates the coil from the magnetic core. A pair of conducting terminals 16 at each end of the transducer furnish means for connecting an indicating circuit to the coil. An insulating glass seal 17 joins each terminal to the case, preventing any loss of pressure.

In order that the very small deflections of diaphragm 10, caused by slight pressure variations, may be accurately detected, it is necessary that the remainder of the magnetic circuit be held stationary in spite of externally caused vibrations and accelerations. This I have accomplished by several techniques of manufacture and assembly which I adopted not only for reasons of reliability but for economy as well.

First, the E-shaped laminations of core 13 are stamped out of a long strip of metal, an economical process, then are bonded together by a thermosetting plastic to form the core. Cylindrical member 18 is then slipped over the core to its fixed position with recesses 19 fitting over the ends of the back portion of the core. The partial assembly is next driven into half of case 11, a press fit being desirable. Coil 14, wrapped on core 15, is placed over the middle arm of the core and the coil ends passed through terminals 16 and soldered thereto. Finally, a vacuum impregnation process employing a thermosetting plastic cements the coil turns together and holds the coil form firmly on the core arm. Thus, the whole core assembly is mounted firmly within half of the case, in fixed relationship to diaphragm 10 when the two halves are assembled with the diaphragm.

I have shown in Fig. 1 a transducer which is most useful in that a "push-pull" effect is created by a change in differential pressure on the diaphragm. This is by reason of the fact that the diaphragm in moving away from one core assembly approaches the other, thereby causing opposite changes in the inductance of the two coils. The coils may be connected as part of any one of a wide variety of bridge circuits and null-balancing networks well known to those skilled in the art, to take advantage of the push-pull effect. The main advantage over a single-coil unit is that the sensitivity of the instrument is greatly increased, i.e., for a given diaphragm deflection a greater electrical indication will result. If single-coil sensitivity is desired, however, one coil assembly may be omitted from the transducer.

Port 20, shown in Fig. 2, is provided for the attachment of a pressure line fitting, to convey the fluid whose pressure is being measured to one side of the diaphragm. If a differential pressure between two fluids is to be measured, a port is provided in each half of case 11. However, if it is desired to measure a fluid pressure as compared with a fixed reference pressure, the port may be omitted from one half of the case, and the instrument assembled at the reference pressure. Then one side of the diaphragm will always be exposed to the reference pressure and the diaphragm deflections will be in proportion to differences between the reference pressure and the pressure of the test fluid. If it is inconvenient to assemble the instrument at the reference pressure, a small opening may be left in the un-ported half of the case, to be sealed later at the reference pressure.

Figure 3:
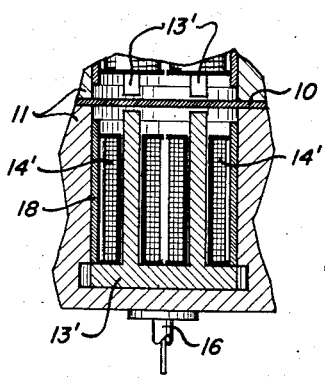
Fig. 3 is a longitudinal section of a core assembly having only two projecting arms, which may be substituted for the core assembly shown in Fig. 1.

Although the E-shaped core is to be preferred in many instances because the center arm makes the most use of the diaphragm deflections (maximum deflection occurs at the diaphragm center), the two-armed core 13' shown in Fig. 3 has advantages not found in the other. This core assembly may be substituted for the core assembly shown in Fig. 1, providing that two more conducting terminals are added to each half of the case for the exit of the ends of the added coil. The core assembly of Fig. 3 is seen to consist of cylindrical member 18, fitted upon core 13', which has a pair of coils 14', each encircling a projecting arm of the core.

A pressure transducer similar to that of Fig. 1, but having instead two core assemblies, as shown in Fig. 3, will have a much greater sensitivity than the transducer of Fig. 1. This is due, in part, to the fact that the four coils may be connected as a four-arm bridge circuit in which all four arms are actively changing in inductance with pressure changes, thus improving on the push-pull action mentioned in connection with the first transducer. A further mutliplying effect, however, is believed to be due to mutual magnetic coupling between coils on the same core. The net result is that the four-coil transducer will produce electrical signals several times those of the E-core transducer in amplitude. This makes possible the elimination of electronic signal amplifiers, with the result that magnetic amplifiers may be driven directly by the transducer.

In order to mitigate changes in the instrument calibration with temperature, I make the case, the diaphragm and the screws out of Invar; and the core laminations are stamped out of a similar nickel-iron alloy. Thus, expansion or contraction of the several parts relative to one another with changes in temperature is negligible.

I have described a new type of pressure transducer, which is economical to manufacture and easy to assemble. Due to my separating the magnetic circuit of the instrument from the case, a larger output signal may be realized at high frequencies. Further, the particular type of core construction employed affords support for the diaphragm at overpressures, preventing damage to the transducer. Other advantages peculiar to my invention will be obvious to those skilled in the art, as will variations in the specific embodiments which I have described by way of example. I do not intend that my invention be limited to those embodiments, but to the features I have claimed below.

I claim as my invention:

1. A pressure transducer comprising a magnetic diaphragm, means for supporting said diaphragm at its periphery, at least one magnetic core having a plurality of arms projecting towards said diaphragm and forming a magnetic circuit therewith and having a base portion extending transverse to the arms and past their edges, means for holding the magnetic core within the diaphragm-supporting means including a member adapted and arranged to make a press fit inside of said supporting means and having cut out portions to fit over the extended base portion, thereby preventing movement of the core relative to said supporting means, an electrical coil surrounding an arm of said core, means for applying a differential pressure to said diaphragm whereby the distance between said diaphragm and said core may be varied thereby varying the reluctance of said magnetic circuit and the inductance of said coil.

2. A pressure transducer as in claim 1, wherein the magnetic core is generally E-shaped, the middle arm being disposed near the center of said diaphragm.

3. A pressure transducer as in claim 2, wherein the electrical coil surrounds the middle arm of said core.

4. A pressure transducer as in claim 1 wherein a magnetic core is disposed on either side of said diaphragm.

5. A pressure transducer as in claim 3 wherein a magnetic core is disposed on either side of said diaphragm.

6. A pressure transducer as in claim 1 wherein said core has two arms, each of which is surrounded by an electrical coil.

7. A pressure transducer as in claim 6, wherein a magnetic core is disposed on either side of said diaphragm.

References Cited in the file of this patent

UNITED STATES PATENTS

| | | |
|---|---|---|
| 2,581,359 | Clark | Jan. 8, 1952 |
| 2,636,386 | Schultheis | Apr. 28, 1953 |
| 2,715,717 | Keithley | Aug. 16, 1955 |